United States Patent [19]

Shiga

[11] Patent Number: 5,300,897
[45] Date of Patent: Apr. 5, 1994

[54] AMPLIFIER PROTECTION CIRCUIT

[75] Inventor: Nobuo Shiga, Kanagawa, Japan

[73] Assignee: Sumitomo Electric Industries, Ltd., Osaka, Japan

[21] Appl. No.: 972,526

[22] Filed: Nov. 6, 1992

[30] Foreign Application Priority Data

Nov. 8, 1991 [JP] Japan .................. 3-293147

[51] Int. Cl.$^5$ .............................................. H03F 1/52
[52] U.S. Cl. ................................ 330/298; 330/207 P
[58] Field of Search ............... 330/149, 298, 207 P; 361/119; 455/217, 283, 286, 287, 307, 308

[56] References Cited

U.S. PATENT DOCUMENTS

| 3,289,117 | 11/1966 | Keerns et al. ............... 333/73 |
| 4,225,827 | 9/1980 | Davis, Jr. ................. 330/149 X |
| 4,985,800 | 1/1991 | Feldman et al. ............. 361/113 |
| 5,159,287 | 10/1992 | Furutani et al. ............ 333/286 |

FOREIGN PATENT DOCUMENTS

| 39606 | 2/1986 | Japan ....................... 330/298 |
| 62-66705 | 3/1987 | Japan . |
| 1567932 | 5/1980 | United Kingdom ........... 455/217 |

Primary Examiner—James B. Mullins
Attorney, Agent, or Firm—Cushman, Darby & Cushman

[57] ABSTRACT

The protection circuit includes a micro strip line whose length is equal to a fourth of the wavelength of an amplification signal frequency on a board and whose one side is connected to the input side of a low noise amplifier, a diode whose one side is connected to the other side of the micro strip line and whose other side is grounded, and a capacitor which is connected to the point where the micro strip line is connected to the diode and whose impedance is sufficiently small at the amplification signal frequency. In this configuration, the diode has virtually no effect to the amplification signal component because the impedance of the protection circuit for the amplification signal frequency viewed from the contact point becomes sufficiently high. In addition, for static electricity charged on the antenna connected to the input terminal, the diode is virtually connected directly to the input side of the low noise amplifier because the micro strip line is almost zero in resistance.

19 Claims, 2 Drawing Sheets

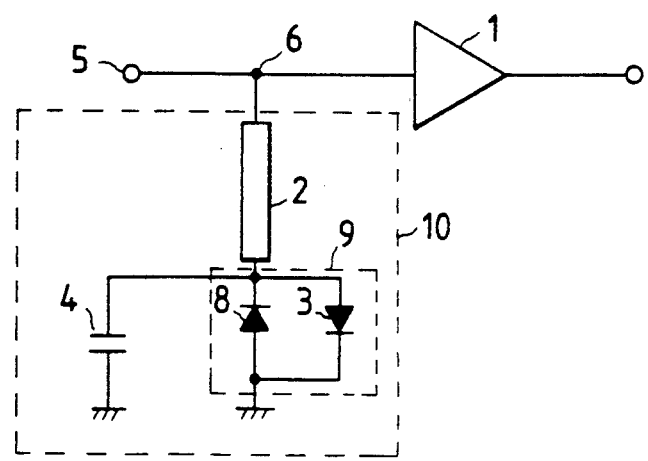
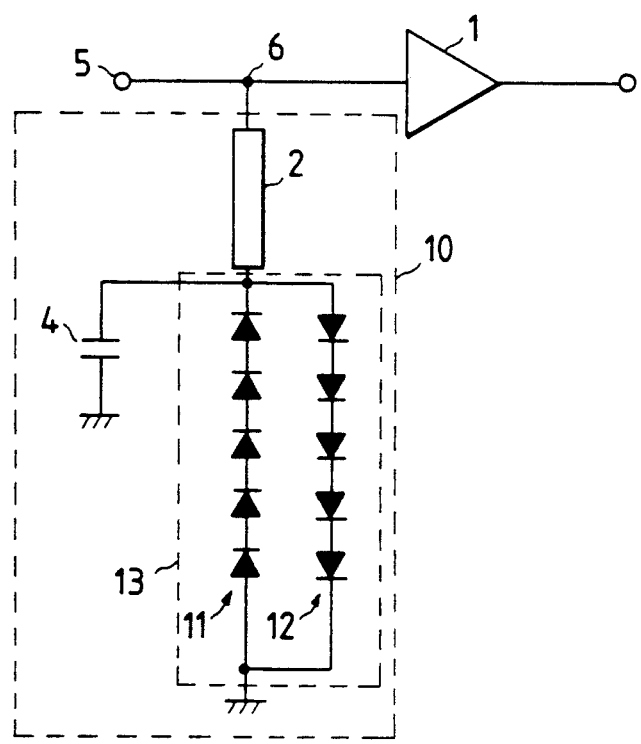

AMPLIFIER PROTECTION CIRCUIT

BACKGROUND OF THE INVENTION

The present invention relates to a protection circuit for a low noise amplifier used, for example, in a receiver on the ground for receiving at the ground microwave signals from communication satellites, broadcast satellites, etc.

With the quick development of information network systems, the demand of satellite communication systems is sharply increasing and their frequency bands are going toward higher frequencies. As high frequency field effect transistors, Schottky barrier type field effect transistors (MESFET: MEtal-Semiconductor junction FET) using compound semiconductors such as GaAs, are put to practical use. In addition, in order to realize smaller, lower cost and higher performance systems, the first amplification stage of the down converter circuit, where high frequency signal is converted to low frequencies, has recently designed as an MMIC (Microwave Monolithic Integrated Circuit).

GaAs-used FETs are superior devices, having low noises even at very high frequencies such as microwave bands, but they have a defect to be weak in electrostatic breakdown as compared with silicon devices. For a long time, efforts have been made to protect a circuit from such electrostatic breakdown. For a low noise amplifier, however, its noise figure is greatly governed by the noise figure of the input circuit. Therefore, there is no practical low noise amplifier with a protection circuit capability because adding an extra circuit to the input circuit may deteriorate the noise figure.

Moreover, it has so far been usual that such a low noise amplifier is connected to a parabolic antenna whose primary radiator mostly has a wave guide structure. Therefore, it has been possible to prevent the electrostatic breakdown only by carefully treating the low noise amplifier (or the circuit including it). This may be one reason why this kind of study has not been so active.

Meanwhile, flat antennas have begun to be put to practical use as ground antennas to receive microwave signals from communication satellites or broadcast satellites. A flat antenna, consisting of many antenna elements located in a flat plane, gathers signal power from each element via conductive wire and provides them as a single output. In the early stage, microwave reception flat antennas were greatly inferior to parabolic antennas both in cost and performance. These days, however, they have reached the level of practical use by flourishing study of micro strip antennas since the late 1970s as well as the improved performance of microwave-use printed circuit boards.

It is also expected that the advance of MMIC (Monolithic Microwave Integrated Circuit) technology will promote the spread of flat antennas because smaller antennas are preferred.

On the contrary, how to connect a flat antenna to a reception system has not necessarily been studied sufficiently. For example, there is a method based on a conventional technology in which a wave guide, which is an ordinary microwave propagation means, is used as a means for connecting them both. However, this method makes it difficult to achieve total miniaturization and weight reduction. Thus, advantages of the miniaturization of the reception systems and the flat shape of the antennas are not sufficiently utilized.

On the other hand, connecting a flat antenna directly to a reception system is difficult. This is because a flat antenna has an antenna pattern (metal) printed film sandwiched between insulators. Thus, the antenna may be charged greatly enough to damage the reception system. The present invention intends to solve such a problem.

SUMMARY OF THE INVENTION

To solve this problem, the protection circuit of the present invention comprises a micro strip line whose length is equal to a fourth of the wavelength of an amplification signal frequency on a used board and whose one side is connected to the input side of a low noise amplifier, a diode whose one side is connected to the other side of the micro strip line and whose other side is grounded, and a capacitor which is connected to the point where the micro strip line is connected to the diode and whose impedance is sufficiently small at the amplification signal frequency.

Because the diode is separated by the micro strip line whose length is equal to a fourth of the amplification frequency wavelength, it has virtually no effect to the amplification signal component. For static electricity, meanwhile, the diode is virtually connected directly to the input side of the low noise amplifier because the ¼ wavelength micro strip line is almost zero in resistance.

BRIEF DESCRIPTION OF THE DRAWINGS

FIG. 4 is a circuit diagram showing a fourth embodiment of the present invention, and FIG. 5 is a circuit diagram showing a fifth embodiment of the present invention.

DETAILED DESCRIPTION OF THE INVENTION

Figure 1:
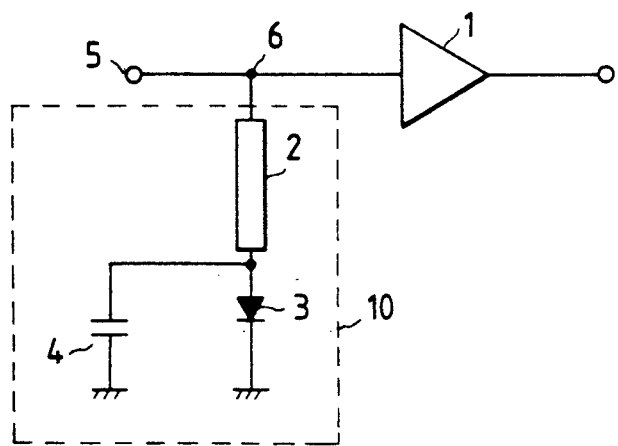
FIG. 1 is a circuit diagram showing a first embodiment of the present invention.

FIG. 1 shows a first embodiment of the present invention. A protection circuit 10 includes a micro strip line 2, a diode 3 and a capacitor 4. The micro strip line is made of gold or the like. The micro strip line 2, connected to the input side of a low noise amplifier 1, is designed to be equal in length to a fourth of the wavelength of a signal frequency amplified by the low noise amplifier 1 (hereafter referred to as the amplification signal frequency). The actual length of the fourth wavelength of the amplification signal frequency depends on the material, thickness, etc., of a board. To the other side of the micro strip line 2, the anode of the diode 3 is connected. For example, this diode 3 can be formed by shortcircuiting the drain and source terminals of an MESFET. In this case, the gate of this FET is used as an anode. The cathode of the diode 3 (when an MESFET is used to form the diode 3, a terminal commonly connected to the drain and source) is grounded. To the diode 3, the capacitor 4 is connected in parallel. Its capacitance is such that the impedance is sufficiently low at the amplification signal frequency. Therefore, at the amplification signal frequency, the capacitor 4 side of the micro strip line 2 is almost shortcircuited and the impedance at the contact point 6 before the capacitor side by a ¼ wavelength, becomes infinitely high. If the capacitance of the capacitor 4 is not to lower its impedance sufficiently at the amplification signal frequency, the impedance of the protection circuit 10 viewed from the contact point 6 does not become high enough to be disregarded, resulting in degenerating the low noise characteristics. When the impedance of the protection circuit 10 viewed from the contact point 6 is ideally infinite, the noise figure of the low noise amplifier 1 is degenerated only by the transmission loss along the micro strip line 2.

Specifically, the capacitance C of the capacitor 4 is set as follows. That is, the impedance Zc of the capacitor is expressed by $Zc = \frac{1}{2\pi f_0 C}$, where $f_0$ is the amplification signal frequency. The impedance Zc should be 1/10 or less of the input/output impedance of the amplifier. Since the input/output impedance of an amplifier is normally about 50Ω, the impedance Zc should be 5Ω or less, that is, $Zc = \frac{1}{2\pi f_0 C} < 5$. Thus, in the present invention, the capacitance C of the capacitor 4 is set as $C > 1/10\pi f_0$.

Figure 2:
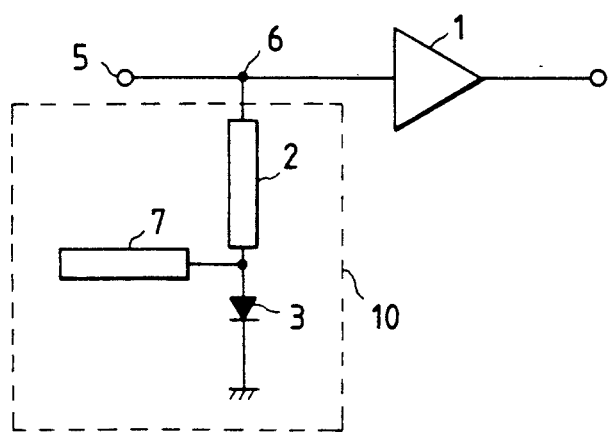
FIG. 2 is a circuit diagram showing a second embodiment of the present invention.

The above mentioned embodiment assumes an MIM (Metal Insulator Metal) type as the capacitor 4. This can be replaced by an open stub 7 in length to the micro strip line 2, as shown in FIG. 2 (second embodiment). In this configuration, the impedance at contact point 6, a ½ wavelength before the edge of the open stub 7, becomes infinitely high because the edge is open.

Figure 3:
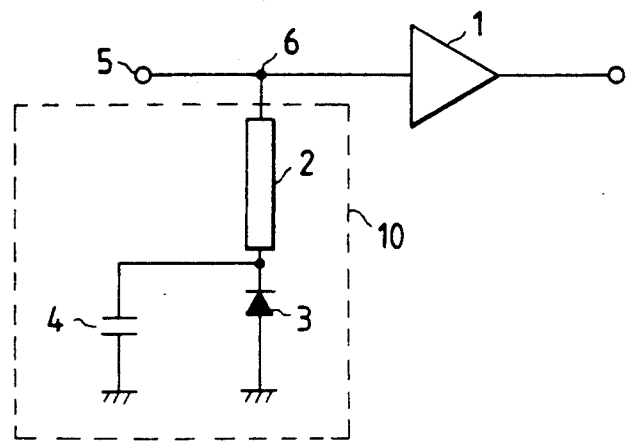
FIG. 3 is a circuit diagram showing a third embodiment of the present invention.

If the antenna connected to the input terminal 5 is charged reversely, the diode 3 should be connected reversely as well, as shown in FIG. 3 (third embodiment). Because the charging polarity depends on the material of the antenna connected to the input terminal 5 and the environment, the polarity of the diode 3 must be determined appropriately.

Meanwhile, a protection circuit of a fourth embodiment shown in FIG. 4 does not depend on the charging polarity of the antenna connected to the input terminal 5. This configuration is formed by connecting another diode 8 in reverse direction to and in parallel to the diode 3 of the first embodiment. This makes it always possible to pull out charges from the antenna connected to the input terminal 5, regardless of the charging polarity.

A fifth embodiment shown in FIG. 5 is useful when the withstand voltage of the diode is not sufficient or when the low noise amplifier 1 is biased deeper than the forward voltage of the diode and the input stage is not D.C. cut by a capacitor. In this embodiment, additional diodes are used. That is, in this embodiment, the diodes 3 and 8 of the fourth embodiment are replaced by two series of multiple diodes 12 and 11, respectively. Note that although this embodiment is based on the fourth embodiment where two diodes are oppositely connected, increasing the number of diodes is also similarly effective for the first to third embodiments where one direction diode is used.

As described above, in the protection circuit of the present invention, the diode has virtually no effect to the amplification signal component because the diode is separated by the micro strip line whose length is equal to a fourth of the amplification frequency wavelength, and for static electricity, the diode is virtually connected directly to the input side of the low noise amplifier because the ¼ wavelength micro strip line is zero in resistance. Therefore, this protection circuit can realize a low noise amplifier, which is resistant to electrostatic breakdown, without degenerating the noise characteristics.

What is claimed is:

1. A protection circuit for connection to an input of a low noise amplifier for amplifying an input signal having a predetermined frequency, comprising:
    a micro strip line whose length is equal to a quarter wavelength of said input signal, a first end of said micro strip line to be connected to an input of said low noise amplifier;
    a first diode having a first side connected to a second end of said micro strip and having a second side grounded; and
    a capacitor connected to a point where said micro strip line connects to said first diode, the impedance of said capacitor being sufficiently small at said input signal frequency.

2. A protection circuit as claimed in claim 1, further comprising a second diode connected in reverse direction to said first diode and in parallel with said first capacitor.

3. A protection circuit as claimed in claim 2, further comprising at least one diode connected in series to and in same direction as said second diode.

4. A protection circuit as claimed in claim 3, wherein said capacitor comprises an open stub micro strip line equal in length to said micro strip line.

5. A protection circuit as claimed in claim 2, wherein said capacitor an open stub micro strip line equal in length to said micro strip line.

6. A protection circuit as claimed in claim 1, further comprising at least one diode connected in series to and in same direction as said first diode.

7. A protection circuit as claimed in claim 6, wherein said capacitor comprises an open stub micro strip line equal in length to said micro strip line.

8. A protection circuit as claimed in claim 1, wherein said capacitor comprises an open stub micro strip line equal in length to said micro strip line.

9. A protection circuit as claimed in claim 1, wherein said micro strip line is made of gold.

10. A protection circuit as claimed in claim 1, wherein said impedance of said capacitor is 1/10 or less of an input/output impedance of said amplifier.

11. A static electricity protection circuit for a microwave frequency low noise amplifier comprising:
    a micro strip line having a first and a second end, said micro strip line being one quarter of an amplification signal frequency wave length in length from said first to said second end, said first end being connected to an input of said amplifier;
    a first diode means having a first side connected to said second end and a second side connected to a low potential with respect to said amplifier input;
    a capacitive means for creating a predetermined low impedance at said amplification frequency, said capacitive means being connected to said second end so that at said amplification frequency the impedance seen by said amplifier input is high.

12. The protection circuit of claim 11, wherein said capacitive means is a metal insulator metal type capacitor.

13. The protection circuit of claim 11, wherein said capacitive means is an open stub micro strip line.

14. The protection circuit of claim 11, wherein said first side of said first diode means is the anode side and said second side of said first diode means is the cathode side.

15. The protection circuit of claim 14, further comprising a second diode means connected in parallel with said first diode means, the cathode of said second diode means being connected to said second end.

16. The protection circuit of claim 15, wherein said second diode means comprises a second plurality of diodes connected in series and in the same direction.

17. The protection circuit of claim 11, wherein said first side of said first diode means is the cathode side, and said second side of said first diode means is the anode side.

18. The protection circuit of claim 11, wherein said first diode means comprises a first plurality of diodes connected in series and in the same direction.

19. The protection circuit of claim 11, wherein said impedance of said capacitor means is 1/10 or less of an input/output impedance of said amplifier.

* * * * *